July 5, 1966  W. C. WELTMAN ETAL  3,259,670
RESINOUS COMPOSITION COMPRISING THE REACTION PRODUCT
OF A POLYAMIDE AND A PHENOL-ALDEHYDE CONDENSATE
Filed Nov. 21, 1960
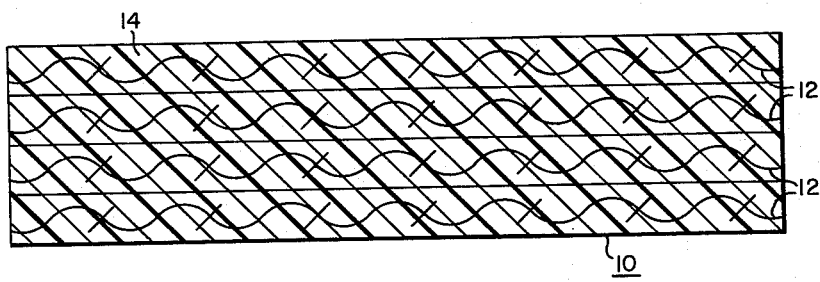
WITNESSES
INVENTORS
Norman E. Martello &
William C. Weltman
BY
ATTORNEY United States Patent Office 3,259,670
Patented July 5, 1966

3,259,670
RESINOUS COMPOSITION COMPRISING THE REACTION PRODUCT OF A POLYAMIDE AND A PHENOL-ALDEHYDE CONDENSATE
William C. Weltman, Wilkinsburg, and Norman E. Martello, Turtle Creek, Pa., assignors to Westinghouse Electric Corporation, East Pittsburgh, Pa., a corporation of Pennsylvania
Filed Nov. 21, 1960, Ser. No. 70,568
6 Claims. (Cl. 260—841)

This invention relates to a novel resinous composition to be employed in preparing resinous articles that possess good impact strength, and to the articles produced therefrom.

For many applications it is desirable to produce molded members of a thermosetting resinous composition in combination with a strengthening or reinforcing filler. Since many members thus produced are subjected to rough handling and treatment, it is necessary that the members possess high impact strength and toughness so that they will not crack, chip, or break when receiving rough handling or treatment.

The object of this invention is to provide a thermosettable resinous composition which, when applied to fibrous material and cured to a thermoset infusible and insoluble state, will provide resinous articles that possess high strength, toughness, and good impact strength.

A further object of this invention is to provide resinous articles comprising a fibrous material and a thermoset resinous composition, which resinous articles possess high strength, toughness, and good impact strength.

Other objects of this invention, will, in part, be obvious and will, in part, appear hereinafter.

For a complete understanding of the nature and the objects of this invention reference is made to the following detailed description and drawing, in which the single figure is a view in cross-section of a laminated member comprising fibrous sheet material and the resinous composition of this invention.

In accordance with this invention there is provided a novel resinous composition which in its cured or thermoset state possesses toughness, good resistance to impact, and other good physical properties.

The novel resinous composition of this invention is prepared by heating an aldehyde, a phenol, and an alcohol soluble polyamide resin in the presence of a suitable catalyst under selected conditions.

The aldehyde employed can be formaldehyde, usually as a 37% water solution; a reaction methylene polymer of formaldehyde such as paraformaldehyde; acetaldehyde; propionaldehyde; butyraldehyde; and mixtures of two or more. Hexamethylene tetramine can be employed also alone or in admixture with any one of the above enumerated aldehydes. For convenience the term formaldehyde will be employed hereinafter in the specification as the aldehyde employed in preparing the resinous composition of this invention. It will be understood however that the above enumerated aldehydes can be employed to replace all or a portion of the formaldehyde.

The phenol employed in preparing the resinous composition of this invention can be selected from the group consisting of phenol (hydroxybenzene), cresols, cresylic acid, xylenols, and alkyl-substituted phenols, or mixtures of any two or more. The best results are secured by using phenol (hydroxybenzene) alone or an admixture of phenol and cresylic acid.

For each mol of the phenol employed there is employed from about one mol to 1.5 mols of formaldehyde. The amount of alcohol soluble polyamide employed is based upon the total weight of the phenol and the formaldehyde employed and can be varied from about 5% to 30% by weight; best results are obtained when from about 8% to about 12% of the alcohol soluble polyamide is employed.

The polyamide employed in this invention is prepared by heating to reaction temperature at least three polyamide-forming reactants; at least one of which is a diamine having at least one hydrogen atom attached to each amino nitrogen atom, at least one of which is a dibasic carboxylic acid, and at least one of which is a polymerizable amino acid. Heating is continued until a polymer of the desired properties is obtained. Thus, heating is usually continued until the polymeric product obtained is capable of being formed into continuous filaments which can be further cold drawn into oriented fibers.

The polyamide is an interpolymer obtained by polymerization of bifunctional reactants comprising at least one diamine having at least one hydrogen atom attached to each amino nitrogen atom, at least one polymerizable monoaminomonocarboxylic acid, and at least one dibasic carboxylic acid.

The diamine and dibasic acid can be combined previously into the salt which is considered as representing two polyamide-forming reactants. In place of dibasic carboxylic acids there can be used their amide-forming derivatives such, for example, as esters, half-esters, acid halides, anhydrides, or amides; in place of the amino acids there can be used their amide-forming derivatives such, for example, as the lactams, esters, acid halides, and amides. For convenience, the invention will be described hereinafter particularly with reference to the use of dibasic carboxylic acids and with the use of amino acids. It is to be understood however that these derivatives are intended to include the above-enumerated substitutes therefor.

The preferred polyamide is prepared by heating together one primary diamine, one dibasic carboxylic acid, and one polymerizable monoaminomonocarboxylic acid. These ingredients are heated together at amide-forming temperatures, usually in the range of about 180° C. to 300° C. until the product has a sufficiently high molecular weight to exhibit fiber-forming properties. As in the case of the simple polyamides, the fiber-forming stage can be determined by touching the molten polymer with a rod and drawing the rod away; when this stage has been reached, a continuous filament of considerable strength and pliability is formed and will adhere to the rod.

When a salt of a diamine and dibasic acid is used, the conversion to the interpolyamide is carried out in the same manner as the preparation of a simple polyamide from a diamine dibasic salt alone as described in U.S. Patent No. 2,130,948. The reaction is carried out by heating the mixture of salt and amino acid at amide-forming temperatures usually between from about 180° C. to 300° C. in the presence or absence of a diluent and under conditions which will permit the water formed in the reaction to escape, at least during the last stages of the reaction, until examination of a test portion of the product indicates that it has the desired fiber-forming properties. Solvents which can be used in the reaction include phenol, the cresols, the xylenols, diphenylolpropane, and o-hydroxydiphenyl. White medicinal oil is an example of a non-solvent which can be used. The reaction can also be carried out in water.

The interpolyamides that possess the most desirable properties for the purposes of this invention are those prepared by 6-aminocaproic acid, diprimary diamines having a radical length of 8 to 14, and dibasic carboxylic acids having a radical length of 6 to 12, the molar ratio of the amino acid ranging from 10% to 90% of that of the diamine, the diamine and dibasic acid being used in substantially equal molecular amounts. The term "radical length" is used as defined in U.S. Patent No. 2,130,948.

The following examples are illustrative of the preparation of super-polyamides for use in this invention. All parts are by weight unless otherwise indicated.

Example I

A mixture of 7.5 parts of 6-aminocaproic acid and 2.5 parts of 2,5-dimethylhexamethylene diammonium alpha, alpha'-dimethyl-adipate (M.P. 158–160° C.) is heated in an evacuated, sealed tube for 2 hours at 210–230° C. The low polymer obtained is then heated for 2 hours more at 220–240° C. under a pressure of 2 mm. The product thus obtained is a clear, pseudo-resinous, tough polymer. It has an intrinsic viscosity of 0.53 and can be spun into fairly strong filaments. The interpolymer melts at 110–115° C. (in fiber form). It is soluble in alcohols and mixtures of alcohols with halogenated hydrocarbons, such as methanol-chloroform, methanol - $\beta$ - trichloroethanol, and methanol-trichloroethylene mixtures. It is also soluble in unsaturated alcohols, such as methallyl alcohol. It is also soluble in the usual polyamide solvents, i.e. formic acid and phenols.

Example II

A mixture of 7 parts of 6-aminocaproic acid and 3 parts of hexamethylene diammonium terephthalate (M.P. 273–275° C.) is heated in a closed vessel for 1.5 hours at 240–250° C. The vessel is then opened and heated for 2 hours more with a current of dry nitrogen bubbling through the molten mass. The interpolyamide obtained is a tough, pseudo-resinous solid which melts at 162–165° C. It has an intrinsic viscosity of 0.78 and can be spun into filaments capable of being cold drawn into oriented fibers. Molded films of this material are quite clear and pliable. The interpolymer possesses solubility characteristics similar to the preceding interpolymer, being soluble in alcohols, alcohol-chlorinated hydrocarbon mixtures, besides the customary polyamide solvents.

Suitable catalysts for use in promoting the resin-forming reaction of the phenol, the formaldehyde, and the super-polyamide above described include the alkali metal hydroxides, carbonates and bicarbonates; the alkali metal hydroxides, oxides and carbonates; ammonia; and organic amines. Examples of such catalysts include sodium hydroxide, potassium carbonate, magnesium hydroxide, barium oxide, sodium bicarbonate, ethylene diamine, aniline, and ammonia. The amount of catalyst employed can be varied from about 0.1% to 5% by weight based on the total weight of the reactants.

The following example is illustrative of the practice of this invention.

Example III

The following ingredients are charged into a reaction vessel fitted with reflux condenser, stirrer and thermometer:

| | |
|---|---|
| Phenol _____lbs__ | 564 |
| Cresylic acid _____lbs__ | 575 |
| Formaldehyde (37%) _____lbs__ | 940 |
| The super-polyamide of Example I _____lbs__ | 100 |
| Ammonia (28%) _____gals__ | 3 |

The reaction vessel is heated slowly until the ingredients begin to reflux (about 98° C.), and is maintained at reflux temperature for a period of time of about 30 minutes. The mixture is then dehydrated at atmospheric pressure for about 30 minutes. The mixture is then maintained under a vacuum of about 23 inches of mercury until a sample of the resin taken from the vessel is clear and no longer cloudy. Substantially all the water is removed from the reaction vessel. To the reaction vessel there are added 100 gallons of 95% ethanol to provide a resinous impregnating varnish composition having a specific gravity of from 1.020 to 1.030, a viscosity at 25° C. of from 300 to 600 centipoises, a set time at 153° C. of from 22 minutes to 24 minutes, and a resins solids content of about 53%.

Woven cotton fabric of a thickness of about 20 mils is impregnated by methods known in the art with the resin varnish compositions of Example III, above, to provide thereon a resin content in an amount of about 56% by weight of a total weight of the treated fabric. Thus, the fabric can be treated with the resinous varnish composition in accordance with the method described in U.S. Patent No. 2,711,982 and assigned to the assignee of the present invention.

The heat treatment which is applied to the fabric to remove substantially all the volatile organic solvent therefrom is conducted so that the resulting treated fabric has a "greenness" of from 20% to 35%.

The greenness is determined by placing a stack of small pieces, of the resin treated cotton fabric in a hot press and pressing it at a temperature of 175° C. and at a pressure of 1000 pounds per square inch for five minutes, and then weighing the amount of resin that is forced out of the stack, that is, the resin that extends beyond the cotton fabric sheet proper and weighing the portion of the exuded resin to the total layer of the sample.

The treated woven cotton fabric is subsequently cut into a number of 6 inch by 6 inch squares, and 10 of these sheets are superimposed one upon another to provide a stack. The stack is placed in a suitable laminating press and pressure of about 1000 pounds per square inch and heat at a temperature of about 180° C. are applied for a period of time of about 50 minutes to provide a laminated member. The laminated member is cut and machined to provide standard Izod impact test specimens. The test specimens withstood about 4.14 foot-pounds before break across grain and about 2.78 foot-pounds before break with grain.

Thus, the resin composition of this invention can be employed to impregnate the fibrous sheet material woven, matted, felted or otherwise to provide treated sheet material that can be employed in the manufacture of safety helmets and the like members which must be capable of withstanding impact without the danger of breaking, cracking, or otherwise becoming adversely affected. Suitable fibrous materials include cotton, glass, asbestos, synthetic fabrics such as nylon, and the like.

Referring to the single figure of the drawing there is shown a laminate 10 prepared from the resinous composition of this invention. The resinous laminate comprises a plurality of sheets of woven fiber sheet material 12 impregnated and bonded together by the thermoset resinous composition of this invention 14.

It is to be understood that the above description and drawing are illustrative of this invention and not in limitation thereof.

We claim as our invention:

1. A composition of matter consisting essentially of a resinous reaction product of a phenol, from about 1 mol to about 1.5 mols of an aldehyde for each mol of said phenol, and from about 5% to 30% by weight, based upon the total weight of the phenol plus the aldehyde, of a polyamide derived from at least one diamine having at least one hydrogen atom attached to each amino nitrogen atom, at least one dibasic carboxylic acid, and at least one polymerizable amino acid.

2. A composition of matter consisting essentially of a resinous reaction product of a phenol, from about 1 to about 1.5 mols of an aldehyde for each mol of said phenol, and from about 5% to 30% by weight, based on the total weight of the phenol plus the aldehyde, of a polyamide derived from 6-aminocaproic acid, a diprimary diamine having a radical length of from 8 to 14, and a dicarboxylic acid having a radical length of 6 to 12.

3. A filament comprising the interpolymer set forth in claim 2.

4. A hardened laminate consisting essentially of a plurality of layers of sheet fibrous material and a resin impregnating the layers, the resin also uniting the layers into a unitary whole, the resin comprising the heat hardened product derived by reacting one mol of a phenol, from about 1 mol to about 1.5 mols of an aldehyde, and from about 5% to 30% by weight, based upon the total weight of the phenol plus the aldehyde, of a polyamide derived by polymerizing bifunctional reactants consisting essentially of at least one diamine having at least one hydrogen atom attached to each amino nitrogen atom, at least one dibasic carboxylic acid, and at least one polymerizable amino acid.

5. A hardened laminate consisting essentially of a plurality of layers of sheet fibrous material and a resin impregnating the layers, the resin also uniting the layers into a unitary whole, the resin comprising the heat hardened product derived by reacting in the presence of an alkaline catalyst, a phenol, from about 1 to about 1.5 mols of an aldehyde for each mol of said phenol, and from about 5% to 30% by weight, based on the total weight of the phenol plus the aldehyde, of a polyamide obtained by polymerizing bifunctional reactants consisting essentially of 6-aminocaproic acid, a diprimary diamine having a radical length of from 8 to 14, and a dicarboxylic acid having a radical length of 6 to 12.

6. In a unitary reinforced resinous laminate characterized by improved impact resistance, the improvement which resides in the provision therein of a hardened resinous composition consisting essentially of the heat hardened product of reaction of 95% to about 70% by weight of the resin components of a phenol-formaldehyde resin and 5% to about 30% by weight of a linear polyamide derived from 6-aminocaproic acid, a diprimary diamine having a radical length of from 8 to 14, and a dicarboxylic acid having a radical length of 6 to 12.

References Cited by the Examiner
UNITED STATES PATENTS

| | | | |
|---|---|---|---|
| 2,292,442 | 8/1942 | Hanford | 260—43 |
| 2,378,667 | 6/1945 | Vaala | 260—43 |
| 2,482,499 | 9/1949 | Nagel | 154—43 |
| 2,757,109 | 7/1956 | Martello | 154—81 |
| 2,891,023 | 6/1959 | Peerman et al. | 260—19 |

FOREIGN PATENTS 538,555  3/1957  Canada.

MURRAY TILLMAN, *Primary Examiner.*

C. F. KRAFFT, E. M. BERGERT, H. L. GATEWOOD, *Assistant Examiners.*